United States Patent
Miwa et al.

(10) Patent No.: US 8,285,242 B2
(45) Date of Patent: Oct. 9, 2012

(54) RADIO FREQUENCY INTEGRATED CIRCUIT AND IC MODULE OF THE SAME

(75) Inventors: Yohichi Miwa, Kanagawa-Ken (JP); Aya Minami, Kanagawa-Ken (JP)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 11/227,945

(22) Filed: Sep. 15, 2005

(65) Prior Publication Data

US 2006/0063506 A1    Mar. 23, 2006

(30) Foreign Application Priority Data

Sep. 17, 2004  (JP) ................................. 2004-271184

(51) Int. Cl.
*H04B 1/28* (2006.01)
(52) U.S. Cl. .................. 455/333; 455/419; 235/375
(58) Field of Classification Search .................... 455/333
See application file for complete search history.

(56) References Cited

U.S. PATENT DOCUMENTS

| | | | |
|---|---|---|---|
| 6,616,034 B2 * | 9/2003 | Wu et al. ...................... | 235/375 |
| 6,679,424 B2 | 1/2004 | Hikita et al. | |
| 2001/0048715 A1 * | 12/2001 | Lee et al. ...................... | 375/219 |
| 2002/0162893 A1 * | 11/2002 | Hikita et al. .................. | 235/492 |
| 2004/0180694 A1 * | 9/2004 | Lai et al. ....................... | 455/558 |
| 2004/0249915 A1 * | 12/2004 | Russell ......................... | 709/223 |
| 2005/0028016 A1 * | 2/2005 | Matsushima et al. ......... | 713/322 |
| 2006/0017571 A1 * | 1/2006 | Arnold et al. ............. | 340/572.7 |
| 2007/0293209 A1 * | 12/2007 | O'Toole et al. ............... | 455/419 |

FOREIGN PATENT DOCUMENTS

| | | |
|---|---|---|
| JP | 10207995 | 8/1998 |
| JP | 10209929 | 8/1998 |
| JP | 10289296 | 10/1998 |
| JP | 2000227956 | 8/2000 |

OTHER PUBLICATIONS

Abstract and machine translation for JP 10-289296, published on Oct. 27, 1998, 12 pp.
Abstract and machine translation for JP 2000-227956, published on Aug. 15, 2000, 13 pp.
Abstract and machine translation for JP 209929, published on Aug. 7, 1998, 18 pp.
Abstract and machine translation for JP 10-207995, published on Aug. 7, 1998, 32 pp.
Japanese Search Report, dated May 29, 2008, for Application No. JP 920040114, 1 pg.

* cited by examiner

*Primary Examiner* — Duc Nguyen
*Assistant Examiner* — Ajibola Akinyemi
(74) *Attorney, Agent, or Firm* — William K. Konrad; Konrad Raynes & Victor LLP

(57) ABSTRACT

A highly convenient radio frequency integrated circuit that can be used at a plurality of different frequency bands, and which can perform communications at the different frequency bands so that data at different frequency bands can be read and a restriction can be imposed on the reading and writing of information. An IC module in a radio frequency integrated circuit includes a plurality of memories; a read-write unit for performing a process of reading data from, and writing data into, the memories; and a selector for receiving an electric signal outputted from an antenna that has received a radio signal.

18 Claims, 3 Drawing Sheets

RADIO FREQUENCY INTEGRATED CIRCUIT AND IC MODULE OF THE SAME

BACKGROUND OF THE INVENTION

1. Field of the Invention

This invention relates in general to an RF (radio frequency) communication devices, and more particularly to a radio frequency integrated circuit that can be used for a plurality of different frequency bands for reading and writing information in a non-contact manner using radio waves or electromagnetic waves.

2. Description of Related Art

In recent years, attention has been focused on a technology called radio-frequency identification (RF-ID) in which a person or an object is identified and managed using a radio frequency integrated circuit (IC) chip. A radio frequency integrated circuit (also referred to as an RF-ID tag, a radio IC tag, and the like) used in RF-ID communicates with a reader/writer using radio waves or electromagnetic waves, and can operate without having a battery by a technology in which power is transmitted from an antenna to an RFID chip.

In specifications of radio frequency integrated circuits, currently usable frequencies are four kinds of frequencies: a band of 135 kHz and below, the 13.56 MHz band, the 860-960 MHz band belonging to the so-called UHF band, and the 2.45 GHz band. The distance within which communication with a reader/writer is allowed varies depending on a frequency band used. Accordingly, frequencies need to be appropriately used depending on purposes as follows: for example, in individual commodity management and the like in which individual communication with each radio frequency integrated circuit is performed, a low frequency such as 13.56 MHz is used; and, in the simultaneous reading of radio frequency integrated circuits attached to a large number of products, the UHF band is used.

However, as described previously, a radio frequency integrated circuit obtains power from radio waves or electromagnetic waves used for communication with a reader/writer. Consequently, the operating frequency in the radio frequency integrated circuit depends on the frequency used for communication and is fixed. Accordingly, a user needs to select and use radio frequency integrated circuits having different frequencies depending on purposes such as the above-described individual commodity management and simultaneous reading. Further, in the case where radio frequency integrated circuits are used for a plurality of purposes in a certain product, it is necessary to prepare a radio frequency integrated circuit for each of frequencies corresponding to the purposes.

As described previously, the operating frequency of a radio frequency integrated circuit depends on the frequency at which IC chip can communicate. Accordingly, a user must appropriately select the type of a radio frequency integrated circuit depending on the purpose. This is a burden on the user. Further, in order to use radio frequency integrated circuits for a plurality of purposes, a plurality of radio frequency integrated circuits must be prepared depending on the purposes. This causes an increase in the cost of installing a system or the like using radio frequency integrated circuits.

If a single radio frequency integrated circuit can be used for a plurality of different frequency bands, there is no necessity to select the type of a radio frequency integrated circuit depending on the purpose or prepare a plurality of radio frequency integrated circuits. Additionally, a system using radio frequency integrated circuits becomes more convenient, and also becomes easy to install. In particular, if, in such a radio frequency integrated circuit, data at different frequency bands can be read by communication at different frequencies and restrictions can be placed on the reading and writing of information depending on which frequency is used, the system becomes much more convenient.

It can be seen that there is a need for a RF integrated circuit and integrated circuit module for reading and writing information in a non-contact manner using radio waves or electromagnetic waves.

SUMMARY OF THE INVENTION

To overcome the limitations in the prior art described above, and to overcome other limitations that will become apparent upon reading and understanding the present specification, the present invention discloses a radio frequency integrated circuit and IC module of the same.

The present invention solves the above-described problems by providing a single radio frequency integrated circuit that can be used for a plurality of different frequency bands.

In accordance to an embodiment of the present invention, a radio frequency integrated circuit includes an antenna for communicating data by use of radio waves and an IC module for processing and storing data, wherein the IC module includes one of a plurality of memories, a read-write unit for performing processes of reading the data from, and writing data into, one of the plurality of memories and a selector for receiving an electric signal outputted from the antenna having received a radio signal, and for specifying one of the plurality of memories as a target memory on which the read-write unit performs read and write processes depending on a frequency of the electric signal.

In another embodiment of the present invention, another radio frequency integrated circuit is provided. This embodiment of a radio frequency integrated circuit includes an antenna for communicating data by use of radio waves and an IC module for processing and storing data, wherein the IC module includes a phase-locked loop (PLL) circuit for receiving an electric signal outputted from the antenna, and for generating and outputting an operating clock based on the electric signal, means for setting the PLL circuit, the setting means receiving one of the electric signal outputted from the antenna and an output signal of the PLL circuit and dynamically setting the PLL circuit based on the one of the electric signal and the output signal so that the PLL circuit generates the operating clock having a fixed frequency and means for processing data, the processing means operating according to the operating clock which has the fixed frequency and which is outputted from the PLL circuit.

In another embodiment of the present invention, an IC module of a radio frequency integrated circuit is provided. The IC module of a radio frequency integrated circuit includes one of a plurality of memories, a read-write unit for performing processes of reading data from, and writing data into, the plurality of memories and a selector for receiving an electric signal outputted from an antenna which has received a radio signal, and for specifying one of the plurality of memories as a target memory on which the read-write unit performs read and write processes depending on a frequency of the electric signal.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration specific embodiments in which the invention may be practiced. It is to be understood that other embodiments may be utilized because structural changes may be made without departing from the scope of the present invention.

The present invention provides a radio frequency integrated circuit that can be used for a plurality of different frequency bands for reading and writing information in a non-contact manner using radio waves or electromagnetic waves.

Figure 1:
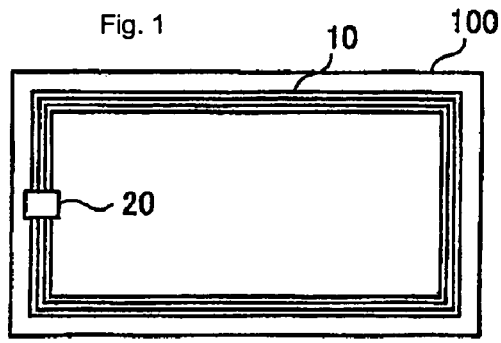
FIG. 1 is a view showing the configuration of a radio frequency integrated circuit of an embodiment of the present invention.

FIG. 1 is a view showing the configuration of a radio frequency integrated circuit 100 according to an embodiment of the present invention. As shown in FIG. 1, the radio frequency integrated circuit 100 includes an antenna 10 for communicating with a reader/writer by use of radio waves, and an IC module 20 which performs the processing (including transmission and reception using the antenna 10) and storage of data. The forms of radio frequency integrated circuits 100 are various, such as a label type and a card type, and can be appropriately used depending on the intended use.

The antenna 10 detects a radio signal of electromagnetic waves, i.e., magnetic field changes, or radio waves, converts the radio signal into an electric signal, and outputs the electric signal. The IC module 20 operates using the electric signal as operating power, and executes processes according to information contained in this electric signal, e.g., calculation, the writing of received data into a memory, the reading and transmission of data from a memory, and the like.

Figure 2:
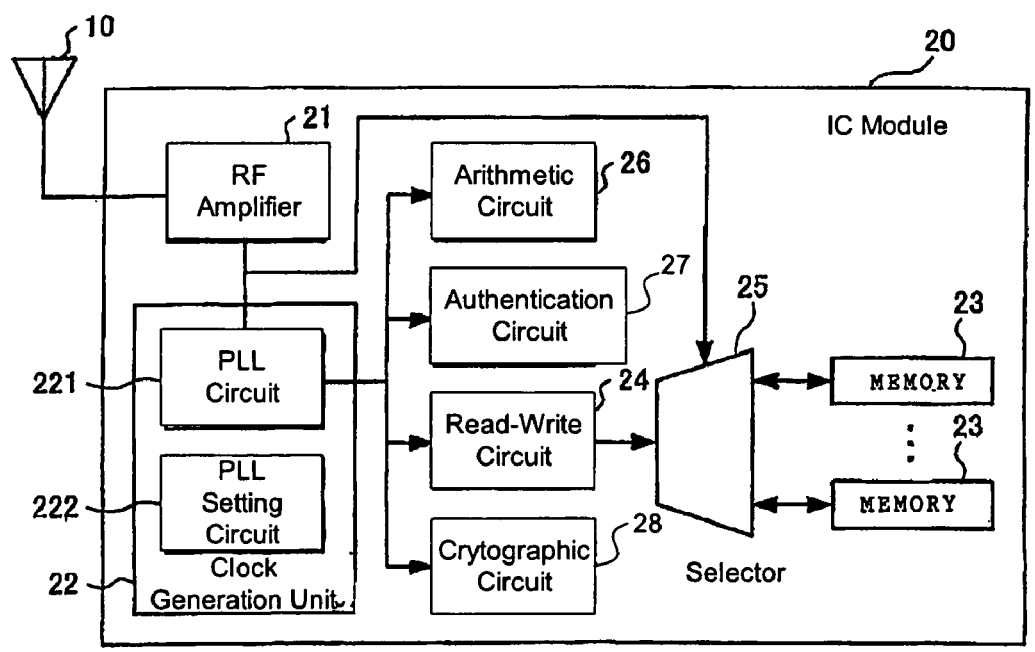
FIG. 2 is a diagram showing the configuration of an IC module in the embodiment.

FIG. 2 is a diagram showing the configuration of the IC module 20 according to an embodiment of the present invention. As shown in FIG. 2, the IC module 20 includes an RF amplifier 21, a clock generation unit 22, memories 23, a read-write circuit 24, a selector 25, an arithmetic circuit 26, an authentication circuit 27, and a cryptographic circuit 28.

The RF amplifier 21 receives an electric signal from the antenna 10, amplifies the electric signal, and outputs the amplified signal. This electric signal contains information transmitted from a reader/writer for example. Further, this electric signal is supplied as operating power for the IC module 20 to each circuit.

The clock generation unit 22 generates an operating clock based on an electric signal, e.g., the received signal, outputted from the RF amplifier 21, and supplies the operating clock with the received signal to each circuit of the IC module 20.

The clock generation unit 22 includes a phase-locked loop (PLL) circuit 221 and a PLL setting circuit 222 that sets the PLL circuit 221.

The PLL circuit 221 generates the operating clock having a constant frequency from the output of the RF amplifier 21, and outputs the operating clock. The IC module 20 operates according to this operating clock regardless of the frequency of a signal received by the antenna 10.

The PLL setting circuit 222 sets the PLL circuit 221 depending on the frequency of a signal received by the antenna 10 so that the PLL circuit 221 generates the operating clock having a constant frequency. Embodiment of setting methods according to the present invention will be described later.

Each memory 23 stores data received by use of radio waves and data to be transmitted by use of radio waves. In this embodiment, a plurality of memories 23 are mounted on the IC module 20. The read-write circuit 24 receives the operating clock and the received signal which are outputted from the clock generation unit 22, and reads and writes data from/to the memories 23. The selector 25 is interposed between the read-write circuit 24 and the memories 23. Further, the selector 25 directly receives the output of the RF amplifier 21, and specifies a target memory 23 on which the read-write circuit 24 performs read and write processes depending on the frequency of the signal. The arithmetic circuit 26 receives the operating clock and the received signal that are outputted from the clock generation unit 22, and performs various logical and arithmetic operations depending on the intended use of the radio frequency integrated circuit 100.

The authentication circuit 27 receives the operating clock and the received signal that are outputted from the clock generation unit 22, and performs an authentication process on a user or a reader/writer, as a precondition for allowing the IC module 20 to operate. The cryptographic circuit 28 receives the operating clock and the received signal which are outputted from the clock generation unit 22, and performs an encryption process and a decryption process on transmission data and received data. Those skilled in the art will recognize that the cryptographic circuit 28 is unnecessary in the case where encryption is not performed when data is transmitted or received. Thus, those skilled in the art will understand that the cryptographic circuit 28 may not be included.

According to an embodiment of the present invention, the radio frequency integrated circuit 100 as shown in FIG. 1 provides a method for obtaining the operating clock having a fixed frequency for received signals having a plurality of frequencies. As described previously, the PLL circuit 221 generates the operating clock based on an electric signal obtained from the RF amplifier 21. In order to obtain the operating clock having a constant frequency from received signals having different frequencies, the PLL setting circuit 222 dynamically changes the setting of the PLL circuit 221. The dynamic changing of the setting of the PLL circuit 221 based on the frequency of a received signal can be realized by various methods.

Figure 3:
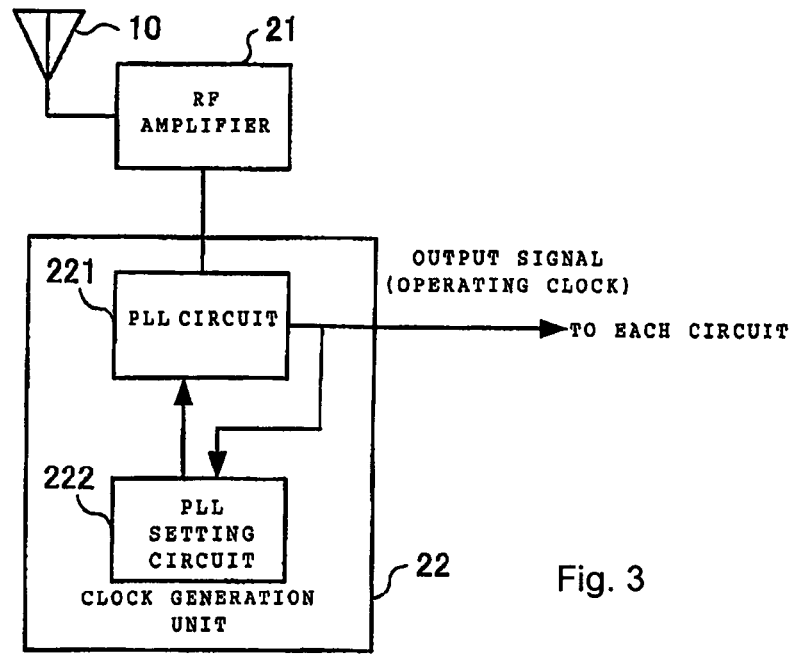
FIG. 3 is a diagram showing an example of the configuration of a clock generation unit in the embodiment.

For example, a first dynamic setting method may be used. The first dynamic setting method uses frequency information, which is embedded in information transmitted from a reader/writer and in which the PLL setting circuit 222 reads this frequency information to set the PLL circuit 221. FIG. 3 is a diagram showing an example of the configuration of the clock generation unit 22 using a first dynamic setting method according to an embodiment of the present invention. Referring to FIG. 3, the PLL setting circuit 222 receives the output signal of the PLL circuit 221, reads frequency information from the received signal, and outputs a setting signal for the PLL circuit 221. For example, according to an embodiment of the present invention the radio frequency integrated circuit 100 provides for two frequencies of 2.45 GHz and 13.56 MHz and that the IC module 20 operates according to the operating clock of 100 MHz. In one case, if the initial setting of the PLL circuit 221 is made to correspond to 2.45 GHz, the PLL circuit 221, upon receiving a signal from a reader/writer, initially divides the received frequency (reference frequency) by 24.5 to generate a clock signal.

In another case, if a signal of 13.56 MHz is received, the PLL circuit 221 outputs an operating clock of 0.55 MHz (=13.56 MHz/24.5). The PLL setting circuit 222 operates according to this operating clock, and reads frequency information from the received signal. Then, based on the obtained frequency information, the PLL setting circuit 222 changes the setting so that the frequency division ratio of the PLL circuit 221 becomes 1/0.1356. From this time, an operating clock of 100 MHz is outputted from the PLL circuit 221. Thus, the IC module 20 operates at 100 MHz regardless of whether a received frequency is 2.45 GHz or 13.56 MHz.

In contrast to the above-described operation example, if a signal of 2.45 GHz is received in the state where the setting of the PLL circuit 221 corresponds to 13.56 MHz, an operating clock of 100 MHz can also be outputted by the PLL setting circuit 222 to read frequency information from the received signal and dynamically change the setting of the PLL circuit 221. Further, even in the case where there are three or more received frequencies, an operating clock of 100 MHz can be outputted regardless of the received frequency by the PLL setting circuit 222 reading frequency information from a received signal and appropriately changing the setting of the PLL circuit 221.

Note that this first dynamic setting method according to an embodiment of the present invention may be realized by causing the arithmetic circuit 26 to operate at various frequencies and to change the setting of the PLL circuit 221, instead of providing the PLL setting circuit 222 intended only to change the setting of the PLL circuit 221.

Figure 4:
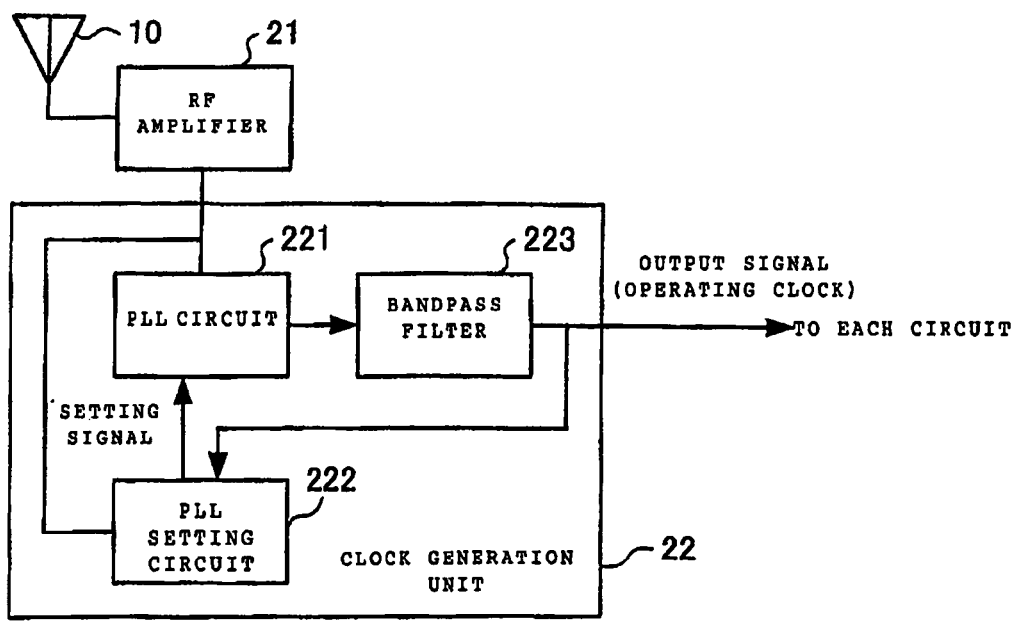
FIG. 4 is a diagram showing another example of the configuration of the clock generation unit in the embodiment.

FIG. 4 is a diagram showing an example of the configuration of the clock generation unit 22 using a second dynamic setting method according to an embodiment of the present invention. According to the second dynamic setting method, a bandpass filter is placed at the output of the PLL circuit 221 and the output of the bandpass filter is fed back to set the PLL circuit 221. Referring to FIG. 4, the output of the PLL circuit 221 is outputted through the bandpass filter 223. The PLL setting circuit 222 receives and monitors the output of the bandpass filter 223, and sets the PLL circuit 221 based on the state of the output. Further, the PLL setting circuit 222 is supplied with power directly from the RF amplifier 21, and operates regardless of the presence or absence of the output of the bandpass filter 223.

For example, if the IC module 20 of the radio frequency integrated circuit 100 operates according to an operating clock of 100 MHz, the bandpass filter 223 of 100 MHz is placed at the output of the PLL circuit 221. Thus, only frequencies around 100 MHz are outputted as an operating clock. In this state, when a signal is outputted from the RF amplifier 21, the PLL setting circuit 222 changes the frequency division ratio of the PLL circuit 221 while monitoring the output of the bandpass filter 223. Then, when a signal comes to be outputted from the bandpass filter 223, the PLL setting circuit 222 fixes the frequency division ratio of the PLL circuit 221 at this time because this signal is a clock signal of 100 MHz. From this time, an operating clock of 100 MHz is outputted from the PLL circuit 221 through the bandpass filter 223. Thus, the IC module 20 operates at 100 MHz regardless of which frequency band the received frequency is in.

Figure 5:
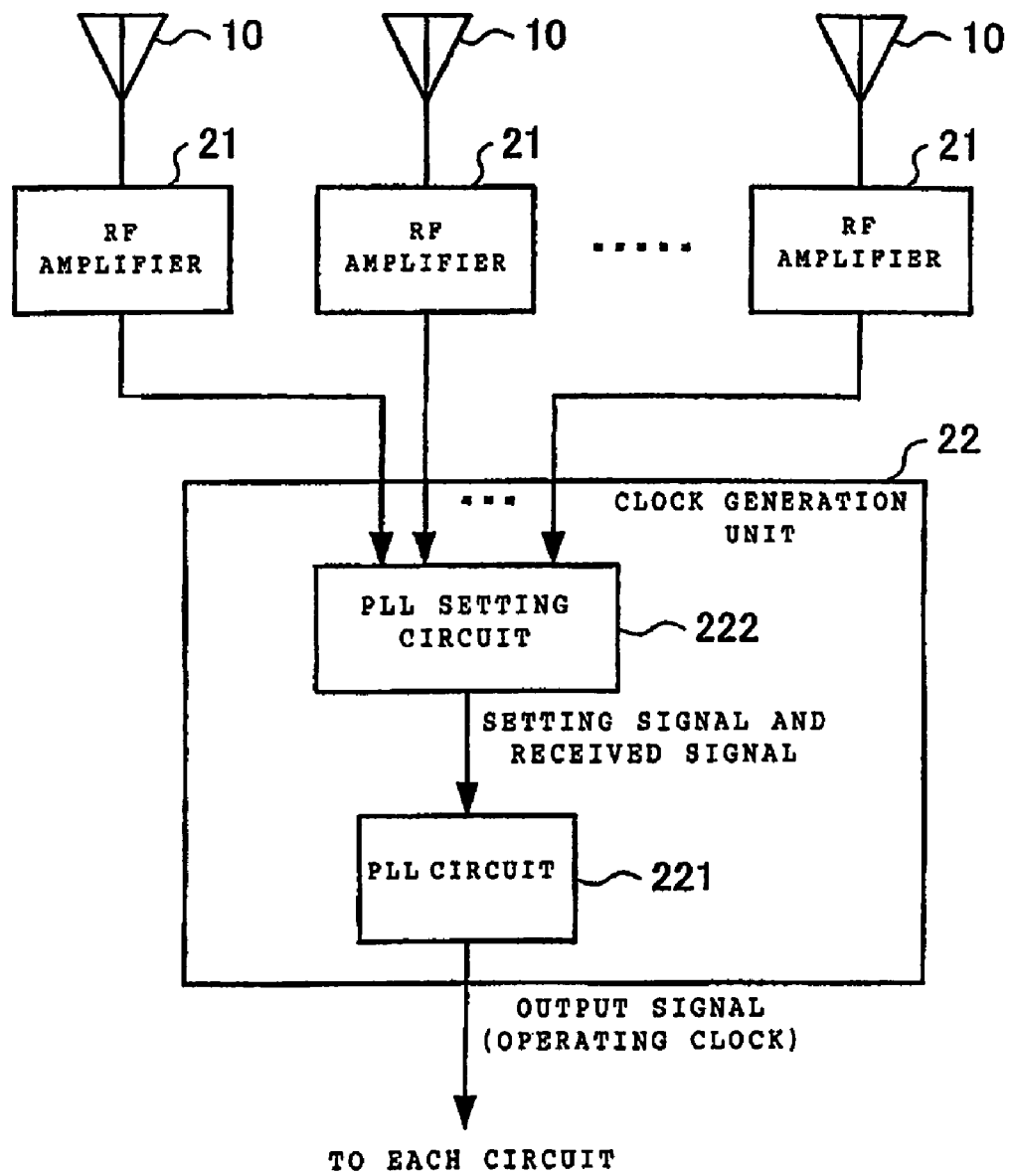
FIG. 5 is a diagram showing yet another example of the configuration of the clock generation unit in the embodiment.

FIG. 5 is a diagram showing an example of the configuration of the clock generation unit 22 using a third dynamic setting method according to an embodiment of the present invention. According to the third dynamic setting method, a plurality of RF amplifiers 21 are provided depending on expected received frequency bands and in which the setting of the PLL circuit 221 is changed depending on which RF amplifier 21 has outputted a signal. Referring to FIG. 5, the IC module 20 includes a plurality of RF amplifiers 21 depending on expected received frequency bands, i.e., frequency bands for which the radio frequency integrated circuit 100 provides. To the RF amplifiers 21, antennas 10 are connected which correspond to the expected received frequency bands, respectively. Further, the PLL setting circuit 222 directly receives the output signal of each RF amplifier 21. The PLL circuit 221 receives a setting signal and a received signal that are outputted from the PLL setting circuit 222.

With the configuration of FIG. 5, the number of RF amplifiers 21 which output signals is limited to one for each received frequency, because the number of antennas 10 which can receive a signal having each frequency is one. Accordingly, the PLL setting circuit 222 determines a received frequency based on which RF amplifier 21 has outputted a signal (i.e., which antenna 10 has received a radio signal), and sets the frequency division ratio of the PLL circuit 221 according to the received frequency.

Although methods of dynamically setting the frequency division ratio of the PLL circuit 221 and configurations for realizing the methods have been described above by showing specific examples, technology to obtain a fixed operating clock from a plurality of received frequencies is not limited to these specific examples. Various existing technologies can be adopted in order to obtain a fixed operating clock using the PLL circuit 221.

Next, the configuration of the memories 23 and a utilization mode in this embodiment will be described. As described with reference to FIG. 2, in this embodiment, the IC module 20 includes the plurality of memories 23 and the selector 25 for selecting a target memory 23 from/to which data is read and written depending on a received frequency. The memories 23 can be provided so as to respectively correspond to expected received frequency bands, e.g., frequency bands for which the radio frequency integrated circuit 100 provides. According to this embodiment of the present invention, it is possible to read different information, e.g., data of a different memory 23, depending on which frequency communication with the radio frequency integrated circuit 100 has been performed at. Further, it is also possible to set up a shared memory 23 to be selected as a target of the reading and writing of data in response to a plurality of received frequencies. If the shared memory 23 is set up, data written by communication at a certain frequency can be read by communication at other frequency. The concrete number of memories 23 and the correspondence between the memories 23 and frequencies can be arbitrarily set using the setting of the selector 25.

Further, the selector 25 can select a specific memory 23 which has been a target of processing in the case where data has been written based on a received signal of a certain specific received frequency, as a target of processing in the case where data is read based on a received signal of other received frequency. In other words, control can be performed so that, in a specific memory 23, a received frequency used for writing data differs from a received frequency used for reading data.

Meanwhile, when attention is focused on received frequencies, the selector 25 can select, for a specific received frequency, a different memory as a target of processing depending on whether data is written or read based on a received signal of the received frequency. Furthermore, in the case where the shared memory 23 is set up, control can be performed so that the selector 25 selects this shared memory 23 as a target of data read and write processes in the case of a specific received frequency and selects the shared memory 23 only as a target of the reading of data in the case of other received frequency. In contrast, in the case of other received frequency, the shared memory 23 can also be selected only as a target of the writing of data.

Such control makes it possible to provide the following restrictions in the case where data is read or written from/to the radio frequency integrated circuit 100: different readers/writers must be used depending on whether data is written or read; data can be written only with a reader/writer using a specific frequency though data can be read with any reader/writer; and the like. By doing so, depending on the mode in which the radio frequency integrated circuit 100 is used, it is possible to increase security in the reading and writing of data.

If the radio frequency integrated circuit 100 according to an embodiment of the present invention is used for commodity management in a shop or store, the radio frequency integrated circuit 100 may be configured to include a first memory 23 corresponding to a frequency band of 13.56 MHz and a second memory 23 corresponding to the UHF band. Because of characteristics of the frequency bands used, information stored in the first memory 23 can be read only at short distances, but information stored in the second memory 23 can be read even at rather distant places. Further, it is assumed that the first memory 23 stores detailed information on an individual commodity, such as a type, a maker, and a lot number, and that the second memory 23 stores only the identification information (serial number, non-duplicate random number, or the like) on the individual commodity.

In order to manage inventories and sales states of commodities, the shop needs to obtain detailed information on a commodity when selling the commodity. For that purpose, at the time of payment, a salesclerk reads information from the first memory 23 with a reader/writer using a frequency band of 13.56 MHz. The read information is transmitted to a management server of the shop to be stored therein. Further, in order to prevent commodities from being stolen, the shop reads information from the second memory 23 with a reader using the UHF band that is placed at a doorway. The read information is transmitted to the management server of the shop, and the management server checks whether the commodity has been paid for or not. Depending on the type of the commodity (e.g., ones highly influenced by individual preferences, such as cloths), there are cases where buyers dislike detailed information on commodities being capable of being read at relatively distant positions. Accordingly, the second memory 23 corresponding to the UHF band does not store detailed information on a commodity but stores only the identification information on the commodity which is necessary for theft prevention.

Thus, in the case where data at different frequency bands are read and written using different frequency bands, radio frequency integrated circuits respectively corresponding to the frequency bands must be prepared and attached to commodities. However, in the case of the radio frequency integrated circuit 100 according to an embodiment of the present invention, a single radio frequency integrated circuit 100 provides for a plurality of frequency bands, and data at different frequency bands can be returned in communication at different frequency bands. Thus, the radio frequency integrated circuit 100 according to an embodiment of the present invention is economical.

Further, it is also possible to set the above-described second memory 23 as a memory (i.e., shared memory) corresponding to a frequency band of 13.56 MHz and the UHF band, and to store information for sales management therein. In this case, it is assumed that the first memory 23 stores detailed information on an individual commodity, such as a type, a maker, and a lot number, as in the above description; and that the second memory 23 stores information on payment. At the time of payment, a salesclerk reads information from the first memory 23 with a reader/writer using a frequency band of 13.56 MHz, and write information indicating that payment has been done to the second memory 23. Then, information is read from the second memory 23 with the reader using the UHF band that is placed at the entrance, thus checking whether the commodity has been paid for. In such a configuration, even if an inquiry is not made at the management server in the shop, whether the commodity has been paid for or not can be immediately determined from information read by the reader.

In the case where the same thing is performed using a plurality of radio frequency integrated circuits respectively corresponding to frequency bands, a salesclerk needs to exchange a reader/writer for other one using a different frequency band depending on whether detailed information on a commodity is read or whether information indicating that the commodity has been paid for is written. However, if the shared memory 23 providing for communication at a plurality of frequency bands is set up as in the above-described second memory 23, a salesclerk does not need to make a complex motion for exchanging a reader/writer when writing information indicating that payment has been done to the second memory 23. Thus, convenience is improved.

According to another embodiment of the present invention, if the radio frequency integrated circuit 100 is used for commodity management in a commodity distribution process, the radio frequency integrated circuit 100 may be configured to include a first memory 23 corresponding to a plurality of frequencies (e.g., 868 MHz and 950 MHz) in the UHF band, a second memory 23 corresponding to 868 MHz in the UHF band, and a third memory 23 corresponding to 950 MHz in the UHF band. Further, the first memory 23 stores information on the type of a commodity, and the second memory 23 stores individual information (e.g., a harvest location, a grade, and the like for a fruit; manufacture data, quality data, and the like for an industrial) on the commodity. Further, to the third memory 23, distribution data (distributor, channel, date, and the like) is written in the distribution process. In a retail store, the type of the commodity and individual information thereon are necessary for commodity management. Accordingly, information is read from the first and second memories 23 with a reader/writer using a frequency band of 868 MHz.

On the other hand, a distributor needs to read the type of the commodity and to read and write distribution data, for commodity management in the distribution process. Accordingly, with a reader/writer using a frequency band of 950 MHz, information is read from the first memory 23, and information is read and written from/to the third memory 23.

In both cases, even if information other than necessary information is read, there are no problems of information processing. However, reading only necessary information in a limited way can shorten the read time for all commodities. In the distribution process, there are cases where a plurality of commodities are grouped to be packed. Further, also in a retail store, the commodities are packed as in the distribution process at the time of the arrival of the commodities. Accordingly, a method in which information is read and written from the outside of the pack using the UHF band is highly convenient. Further, as described previously, by setting up the memories 23 respectively corresponding to different frequency bands in the UHF band and appropriately using readers/writers using different frequency bands, information can be obtained in a desired category to be classified and summarized.

Incidentally, according to an embodiment of the present invention, the type of a commodity and the identification information thereon are information which is initially imparted and which is not changed, but distribution data is information which is updated whenever necessary in the distribution process. Accordingly, the selector 25 may perform control so that the first and second memories 23 allow only the reading of data and that the third memory 23 allow both the reading and writing of data.

As described above, in the radio frequency integrated circuit 100 according to an embodiment of the present invention, the clock generation unit 22 allows operation according to a fixed operating clock regardless of a received frequency. Further, the radio frequency integrated circuit 100 has the following configuration: the plurality of memories 23 are mounted on the IC module 20, and a target memory 23 on which the read-write circuit 24 performs read and write processes is specified depending on the received frequency by the selector 25 to be used. Accordingly, communication with the radio frequency integrated circuit 100 can be performed using a plurality of frequency bands. Additionally, control by the selector 25 makes it possible to arbitrarily return data at the same frequency band or data at different frequency bands in the case where information is read using different frequency bands.

Accordingly, radio frequency integrated circuits respectively corresponding to a plurality of frequency bands do not need to be prepared in order to perform communication using the frequency bands, and it is sufficient that a single radio frequency integrated circuit 100 is prepared. Thus, this embodiment is also economical.

Further, in this embodiment, the reading and writing of data using different frequency bands can be arbitrarily and variously controlled by appropriately setting a controlling method by the selector 25. Thus, this embodiment is very convenient.

Incidentally, in the above-described embodiment, the plurality of memories 23 are mounted on the IC module 20 in order to provide for communication at a plurality of frequency bands. This includes not only the case where a plurality of memories 23 are physically provided but also the following case: a single or several memories 23 are physically mounted, memory areas respectively corresponding to the plurality of frequency bands or a shared memory area is set up in the memory or memories 23, and the selector 25 controls each memory area.

According to the present invention thus constituted, a plurality of memories are mounted on an IC module, and a target memory on which a read-write circuit performs read and write processes is specified depending on a received frequency by a selector to be used. Accordingly, communication with a radio frequency integrated circuit can be performed using a plurality of frequency bands. Additionally, control by the selector makes it possible to arbitrarily return data at the same frequency band or data at different frequency bands, in the case where information is read using different frequency bands. Furthermore, control by the selector makes it possible to arbitrarily place restrictions on the reading and writing of information depending on a frequency band used for communication.

The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A radio frequency integrated circuit for use with an RFID tag for use on a commodity, comprising:
   an antenna for communicating data by use of radio waves, including detecting a radio signal of a first frequency and detecting a radio signal of a second frequency; and
   an IC module for processing and storing data, wherein the IC module comprises:
      a plurality of memories;
      a read-write unit for performing processes of reading the data from, and writing data into, a target memory of the plurality of memories; and
      a selector for receiving an electric signal outputted from the antenna having received a radio signal, and for specifying a first memory of the plurality of memories as a target memory for reading the first target memory in response to detection of said radio signal of said first frequency and for restricting against reading the second memory in response to detection of said radio signal of said first frequency, and for specifying a second memory of the plurality of memories as a target memory for reading the second target memory in response to detection of said radio signal of said second frequency,
   wherein the plurality of memories and the read-write unit are in the RFID tag, wherein the first frequency is in the MHz range and the second frequency is higher than the first frequency and is in the UHF range, wherein the read-write unit performs both read and write processes in said first memory as a specified target memory in response to said first frequency of a radio signal, wherein the read-write unit performs both read and write processes in said second memory as a specified target memory for shared memory in response to said first frequency of a radio signal, wherein the read-write unit performs only read processes in said second memory as a specified target memory in response to said second frequency of a radio signal and wherein the second memory contains information for the commodity including information adapted for theft prevention of the commodity and wherein the first memory contains information on the commodity which is more detailed than the information in the second memory; the radio frequency integrated circuit further comprising:
   a PLL circuit adapted to receive the electric signal outputted from the antenna, and generate and output an operating clock based on the outputted electric signal; and
   a PLL setting unit adapted to receive one of the electric signal outputted from the antenna and an output signal of the PLL circuit, and dynamically set the PLL circuit based on the one of the electric signal and the output signal so that the PLL circuit generates the operating clock having a fixed frequency, wherein the read-write unit operates according to the operating clock which has the fixed frequency and which is outputted from the PLL circuit.

2. The radio frequency integrated circuit according to claim 1, wherein the one of the plurality of memories is provided to correspond to a radio signal having a predetermined frequency that is expected to be received by the antenna.

3. The radio frequency integrated circuit according to claim 1, wherein one of the plurality of memories is selected as a target on which the read-write unit performs read and write processes in response to only a specific frequency; and wherein at least one of the plurality of memories is selected as a target for shared memory on which the read-write unit performs read and write processes in response to a plurality of frequencies.

4. The radio frequency integrated circuit according to claim 3, wherein the selector specifies at least one of the plurality of memories selected as a target for shared memory for data read and write processes in the case where a radio signal has the specific frequency, and specifies at least one of the plurality of memories selected as a target for shared memory for read and write processes in the case where a radio signal has a different frequency.

5. The radio frequency integrated circuit according to claim 3, wherein the selector specifies at least one of the plurality of memories selected as a target for shared memory for data read and write processes in the case where a radio signal has the specific frequency, and specifies at least one of the plurality of memories selected as a target for shared memory for data write process in the case where a radio signal has a different frequency.

6. The radio frequency integrated circuit according to claim 1, wherein the selector specifies one of the plurality of memories specified as a target of a data write process in the case where a radio signal has a specific frequency, as a target of a data read process in the case where a radio signal has a different frequency.

7. The radio frequency integrated circuit according to claim 1, wherein in the case where the selector specifies one of the plurality of memories in compliance to the same frequency, the selector specifies one of the plurality of memories as a target of a data read process and specifies another of the plurality of memories as a target of a data write process.

8. The radio frequency integrated circuit according to claim 1, further comprising a circuit for receiving data and transmitting data; and a cryptographic circuit, for decrypting data received by the device and for encrypting data to be transmitted by the device.

9. An IC module of a radio frequency integrated circuit for use with an RFID tag for use with a commodity, and for use with an antenna for communicating data by use of radio waves, including detecting a radio signal of a first frequency and detecting a radio signal of a second frequency, the IC module comprising:
a plurality of memories;
a read-write unit for performing processes of reading data from, and writing data into, a target memory of the plurality of memories; and
a selector for receiving an electric signal outputted from the antenna which has received a radio signal, and for specifying a first memory of the plurality of memories as a target memory for reading the first target memory in response to detection of said radio signal of said first frequency and for restricting against reading the second memory in response to detection of said radio signal of said first frequency, and for specifying a second memory of the plurality of memories as a target memory for reading the second target memory in response to detection of said radio signal of said second frequency,
wherein the plurality of memories and the read-write unit are in the RFID tag, wherein the first frequency is in the MHz range and the second frequency is higher than the first frequency and is in the UHF range, wherein the read-write unit performs both read and write processes in said first memory as a specified target memory in response to said first frequency of a radio signal, wherein the read-write unit performs both read and write processes in said second memory as a specified target memory for shared memory in response to said first frequency of a radio signal, wherein the read-write unit performs only read processes in said second memory as a specified target memory in response to said second frequency of a radio signal and wherein the second memory contains information for the commodity including information adapted for theft prevention of the commodity and wherein the first memory contains information on the commodity which is more detailed than the information in the second memory; the IC module further comprising:
a PLL circuit adapted to receive the electric signal outputted from the antenna, and generate and output an operating clock based on the outputted electric signal; and
a PLL setting unit adapted to receive one of the electric signal outputted from the antenna and an output signal of the PLL circuit, and dynamically set the PLL circuit based on the one of the electric signal and the output signal so that the PLL circuit generates the operating clock having a fixed frequency,
wherein the read-write unit operates according to the operating clock which has the fixed frequency and which is outputted from the PLL circuit.

10. The IC module according to claim 9, wherein the one of the plurality of memories is provided to respectively correspond to radio signals having a predetermined frequency that is expected to be received by the antenna.

11. The IC module according to claim 9, wherein one of the plurality of memories is selected as a target on which the read-write unit performs read and write processes, in response to only a specific frequency; and one of the plurality of memories is selected as a shared memory targeted for the read-write unit to perform read and write processes in response to a plurality of frequencies.

12. A method for communicating data by use of radio waves, comprising:
detecting a radio signal of a first frequency using a device having a read-write unit, a target memory selector, and a plurality of memories including first and second target memories;
using the read-write unit and the selector, specifying the first target memory and reading the first target memory in response to detection of said radio signal of said first frequency;
using the read-write unit and the selector, restricting against reading the second memory in response to detection of said radio signal of said first frequency;
detecting a radio signal of a second frequency using the device; and using the read-write unit and the selector, specifying the second target memory and reading the second target memory in response to detection of said radio signal of said second frequency,
wherein the plurality of memories and the read-write unit are in an RFID tag on a commodity, wherein the first frequency is in the MHz range and the second frequency is higher than the first frequency and is in the UHF range, wherein the read-write unit performs both read and write processes in said first memory as a specified target memory in response to said first frequency of a radio signal, wherein the read-write unit performs both read and write processes in said second memory as a specified target memory for shared memory in response to said first frequency of a radio signal, wherein the read-write unit performs only read processes in said second memory as a specified target memory in response to said second frequency of a radio signal and wherein the second memory contains information for the commodity including information adapted for theft prevention of the commodity and wherein the first memory contains information on the commodity which is more detailed than the information in the second memory; the method further comprising:

using a PLL circuit for receiving an electric signal outputted from an antenna for detecting the radio signal of the first frequency and for detecting the radio signal of the second frequency, and the PLL circuit also for generating and outputting an operating clock based on the outputted electric signal; and using a PLL setting unit for receiving one of the electric signal outputted from the antenna and an output signal of the PLL circuit, dynamically setting the PLL circuit based on the one of the electric signal and the output signal so that the PLL circuit generates the operating clock having a fixed frequency, wherein the read-write unit operates according to the operating clock which has the fixed frequency and which is outputted from the PLL circuit.

13. The method of claim 12, wherein one of the plurality of memories is provided to correspond to a radio signal having a predetermined frequency that is expected to be received by the antenna.

14. The method of claim 12, wherein one of the plurality of memories is specified as a target memory on which the read-write unit performs at least one of read and write processes in response to only a specific frequency; and wherein at least one of the plurality of memories is specified as a target memory for shared memory on which the read-write unit performs at least one of read and write processes in response to a plurality of frequencies.

15. The method of claim 14, wherein the specifying specifies at least one of the plurality of memories specified as a target memory for shared memory for at least one of data read and write processes in the case where a radio signal has the specific frequency, and specifies at least one of the plurality of memories specified as a target memory for shared memory for at least one of read and write processes in the case where a radio signal has a different frequency.

16. The method of claim 14, wherein the specifying specifies at least one of the plurality of memories specified as a target memory for shared memory for at least one of data read and write processes in the case where a radio signal has the specific frequency, and specifies at least one of the plurality of memories specified as a target for shared memory for data write process in the case where a radio signal has a different frequency.

17. The method of claim 12, wherein the specifying specifies one of the plurality of memories specified as a target memory of a data write process in the case where a radio has a specific frequency, and as a target memory of a data read process in the case where a radio signal has a different frequency.

18. The method of claim 14 further comprising:
receiving data;
transmitting data; and
using a cryptographic circuit, decrypting data received by the device and encrypting data to be transmitted by the device.

* * * * *